United States Patent [19]
Bar-Kana et al.

[11] Patent Number: 5,587,636
[45] Date of Patent: Dec. 24, 1996

[54] OBSERVER-COMPENSATOR FOR AN ELECTRIC MOTOR SYSTEM

[75] Inventors: Izhak Bar-Kana, Wynnewood; Predrag Filipovic, Philadelphia, both of Pa.

[73] Assignee: Kulicke and Soffa Investments, Inc., Wilmington, Del.

[21] Appl. No.: 394,381

[22] Filed: Feb. 24, 1995

[51] Int. Cl.$^6$ .................................................. G06F 15/46
[52] U.S. Cl. .................... 318/561; 318/568.22; 318/632; 364/151; 364/164
[58] Field of Search .................................. 318/560–574, 318/632, 609, 610; 364/148–167.01, 474.15, 474.28–474.37

[56] References Cited

U.S. PATENT DOCUMENTS

| | | | |
|---|---|---|---|
| 4,943,759 | 7/1990 | Sakamoto et al. | 318/568.11 |
| 5,057,992 | 10/1991 | Traiger | 364/148 |
| 5,352,961 | 10/1994 | Tajima et al. | 318/561 |
| 5,396,414 | 3/1995 | Alcone | 364/148 |
| 5,442,544 | 8/1995 | Jelinek | 364/149 |
| 5,459,381 | 10/1995 | Itoh | 318/560 |

*Primary Examiner*—Brian Sircus
*Attorney, Agent, or Firm*—John B. Sowell

[57] ABSTRACT

In a motor system controlled by a central processing unit, an observer-compensator is provided which modifies the command signal being applied to the actual motor system to be controlled. The observer-compensator comprises in the observer portion, a simulated ideal motor system without disturbance forces. The velocity output of the simulated ideal motor system is compared to the velocity output of the actual system to produce a velocity error signal (Verr). A feedback compensator in the simulated ideal motor system is adjusted to compensate for the velocity error signal without disturbance forces.

After disturbance forces are introduced into the actual motor system, a comparison of the output of the actual motor system with the output of the simulated ideal motor system produces a position error signal ($P_D - P_A$) which is applied to the compensator portion of the observer-compensator. The compensator portion comprises a disturbance reconstruction device which is coupled to the position error signal. The disturbance reconstruction device is adjusted until the position error signal is compensated for in the simulated ideal motor system and then the output of the reconstruction device is applied to the actual motor system. When the output of the compensation device is further adjusted so that the force output of the observer-compensator ($F_R$) is equal to the unmeasurable disturbance forces ($F_U$), the actual motor system performs as if the unmeasurable disturbance forces did not exist.

20 Claims, 5 Drawing Sheets

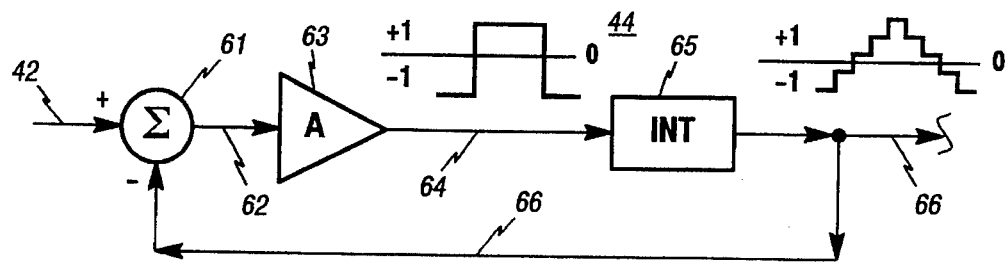
Fig. 5
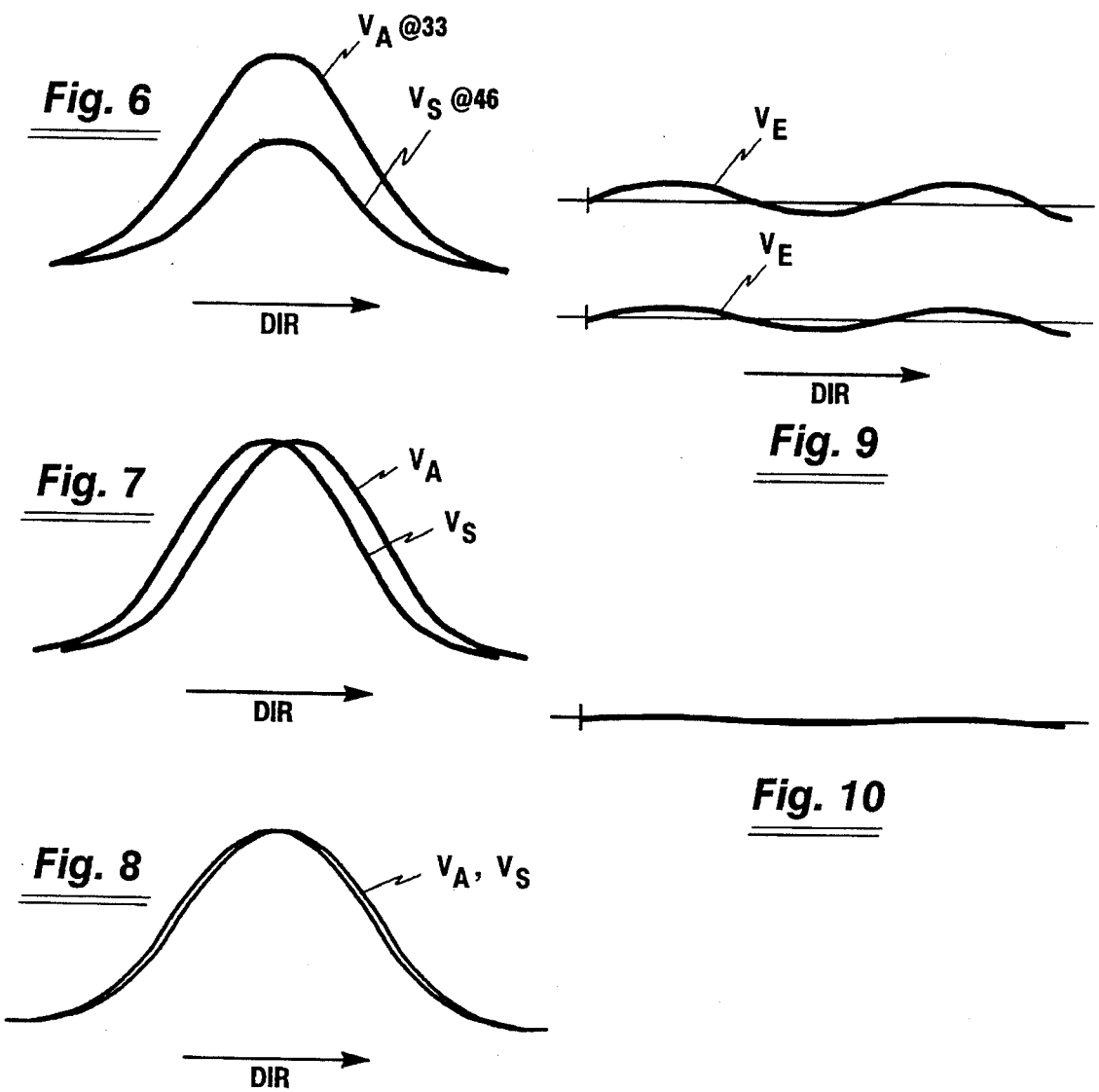
Fig. 6
Fig. 7
Fig. 8
Fig. 9
Fig. 10

OBSERVER-COMPENSATOR FOR AN ELECTRIC MOTOR SYSTEM

BACKGROUND OF THE INVENTION

1. Field of the Invention

The present invention relates to observer-compensators of the type employed in motor systems. More particularly, the present invention relates to a novel dynamic observer-compensator for use in electric as well as other types of motor systems for substantially eliminating unmeasurable disturbance forces. 2. Description of the Prior Art Motors are employed in numerous types of positioning devices comprising aircraft, missiles, machine tools, etc. in the form of rotary or linear actuators used to rapidly and accurately position a moving part of the motor. All types of motor actuators have unmeasurable resistance forces. When an electric motor is continuously moving, there are created unmeasurable disturbance forces as well as cogging forces. The major unmeasurable disturbance forces result from outside forces and variable friction forces in the system as well as cogging forces in the electric motors. Cogging forces result from parasitic, magnetic forces of motor magnets on the iron core and are not constant. The cogging force varies with position, direction, speed, size, etc. as well as magnetic characteristics of the materials used in the motors. Heretofore, it has not been possible to map or anticipate or measure these unmeasurable and variable forces. Had the prior art been able to measure these unmeasurable disturbance forces, it would have been possible to eliminate them.

Standard feedback and feed forward control systems for electric motors are known and are commonly used when designers attempt to rapidly position a motor along a series of positions defining a desired trajectory. It is desirable to control the trajectory of a motor without lagging errors and to rapidly position a working tool at an end position without any overshoot of oscillations whatsoever.

Automatic wire bonders that are used by the semiconductor industry are known to employ desired position trajectories in order to bond fine wire connections between a pad on the semiconductor chip and a lead frame or carrier. The automatic wire bonder shown and described in U.S. Pat. No. 4,266,710 can be controlled by command signals to follow precise predetermined paths which result in precise and repeatable loops of fine wire interconnections provided that the X, Y and Z drive motors of the system are not pushed to their extreme limits where the aforementioned unmeasurable forces become so significant that a compromise in effecting the speed of obtaining a desired position has become necessary.

Heretofore, attempts have been made to compensate for unwanted unmeasurable forces in high speed, high performance precise positioning rotary and linear motors. The prior art does not teach or suggest any system for measuring, modeling or replicating these unmeasurable forces including cogging forces in any electric motor system. Accordingly, it would be highly desirable to provide a dynamic real time system for replicating unmeasurable disturbance forces which would allow an increase in the speed of operation and performance of electric motor systems as well as other types of motor systems.

SUMMARY OF THE INVENTION

It is a primary object of the present invention to provide a novel real time observer-compensator for an electric motor system.

It is a primary object of the present invention to provide an observer-compensator having a plurality of gain adjustments and compensators for producing a replica of an ideal motor system.

It is a primary object of the present invention to provide an observer-compensator having a gain adjustment compensator for producing a replica of unmeasurable disturbance forces in an electric motor system.

It is a primary object of the present invention to provide an observer-compensator comprising a real time simulator for simulating an ideal motor system and a cogging force system or other unmeasurable force systems.

It is an object of the present invention to provide an observer-compensator for eliminating unmeasurable cogging forces in an electric motor system.

It is an object of the present invention to provide a method for eliminating unmeasurable disturbance forces in an electric motor system.

According to these and other objects of the present invention, there is provided an observer-compensator coupled between the command signal output of a computer controller and an actual motor system. The observer-compensator comprises an ideal motor simulator for simulating the actual motor system without the unmeasurable disturbance forces and there is further provided an unmeasurable disturbance force reconstruction device in the observer-controller having an output which is coupled to the input of the actual motor system that compensates for the unmeasurable disturbance forces.

BRIEF DESCRIPTION OF THE DRAWINGS

FIG. 5 is a schematic drawing of a low pass filter comprising elements that may be implemented in software or hardware;

FIG. 6 is a schematic waveform diagram of the output of the simulator shown in FIG. 4 before adjustment and compensation;

FIG. 7 is a schematic waveform diagram at the output of the simulator of FIG. 4 after a first adjustment;

FIG. 8 is a schematic waveform diagram of the output of the simulator of FIG. 4 after a second adjustment;

FIG. 9 is a schematic waveform diagram of the low cogging error signal before and after a first compensation and stabilization to the simulator shown in FIG. 4;

FIG. 10 is a schematic waveform diagram of the low cogging error signal after a second compensation to the simulator;

DESCRIPTION OF THE PREFERRED EMBODIMENTS

Figure 1:
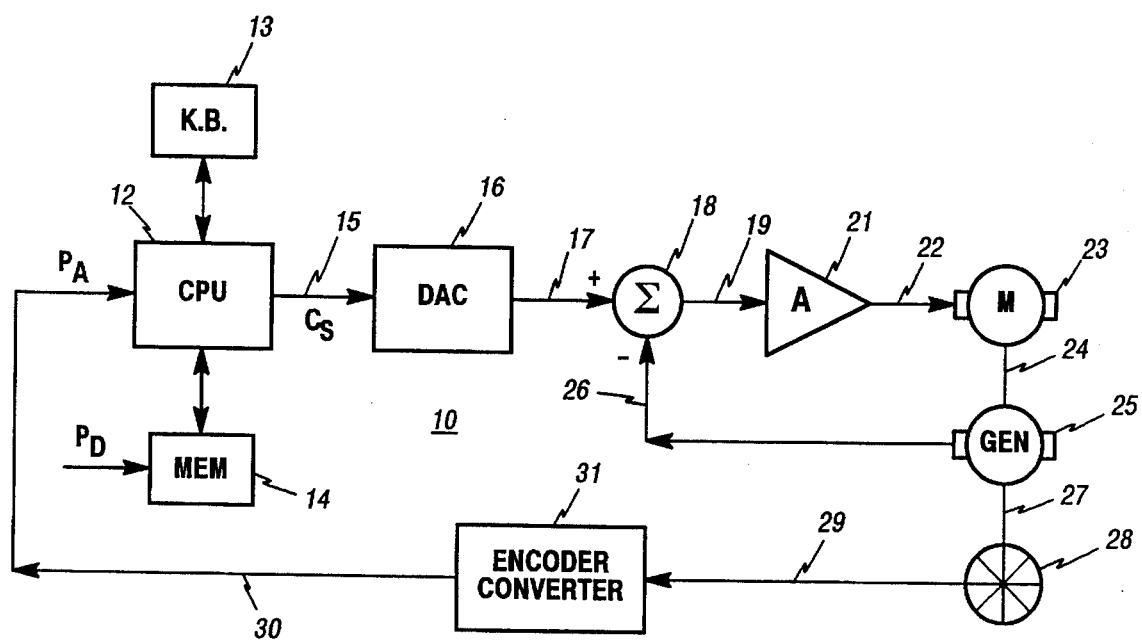
FIG. 1 is a schematic drawing of a prior art close-loop microprocessor controller for controlling the Z drive of an automatic wire bonding machine.

Refer now to FIG. 1 showing a schematic drawing of a prior art closed-loop controller 10 for a Z drive motor. The system 10 is shown and described in U.S. Pat. No. 4,266,710 and is employed in a high speed automatic wire bonder. The system comprises a central processing unit 12 which is controlled by a keyboard 13 and software residing in a memory 14 which is shown separate and apart from the CPU 12. The desired position $P_D$ is loaded into the memory 14 and is accessible by the CPU 12 when creating a command signal on output line 15 to a digital to analog converter (DAC) 16. The digital output from DAC 16 on line 17 is applied to a summing circuit 18 as a positive input. The output from summing circuit 18 on line 19 is applied to an amplifier 21 which generates an analog signal on line 22 for controlling and driving the motor 23 which is coupled by a driveshaft 24 to a tachometer generator 25. The tachometer generator produces a feedback velocity signal on line 26 which is coupled to the negative input of the summing circuit 18 as velocity feedback. Further, the motor 23 and generator 25 are coupled by a shaft 27 to an encoder 28 which generates a digital signal on line 29 that is converted by the converter encoder 31 to a digital signal on line 30 that is acceptable to the CPU 12. Thus, it will be understood that the desired position $P_D$ is fed to the computer 12 and a command signal is generated which is coupled to the motor 23 and the feedback circuit from the encoder 28 informs the computer whether the actual desired position $P_A$ is obtained. The difference between the desired position $P_D$ and the actual position $P_A$ line 30 is the position error which is used to create the next command signal on line 15.

Figure 2:
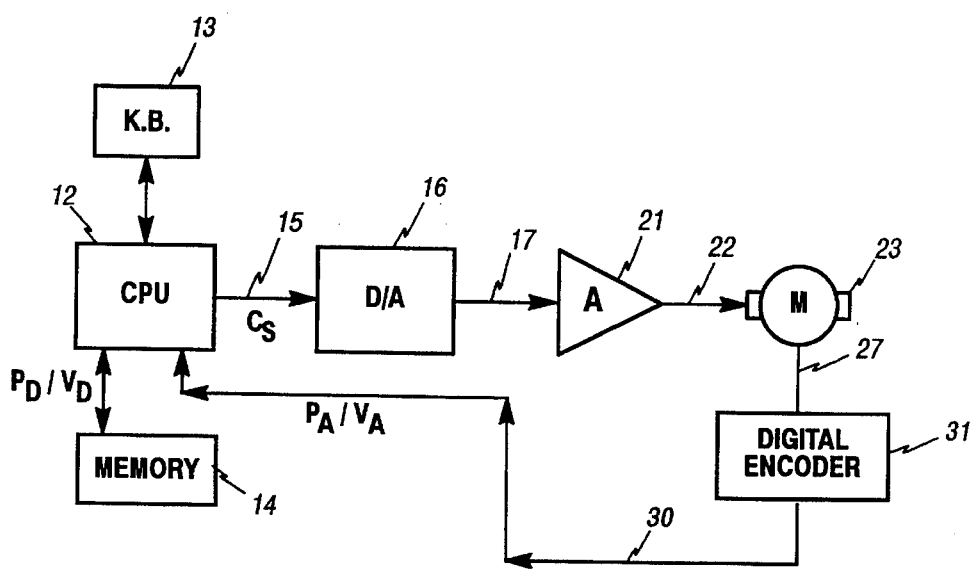
FIG. 2 is a schematic drawing of a digital implementation of the microprocessor controller shown in FIG. 1.

Refer now to FIG. 2 showing a schematic drawing of a digital implementation of a controller shown in FIG. 1. The numerals shown on FIG. 2 that are identical to the numerals on FIG. 1 represent the same elements and do not require additional explanation here. It will be understood that the digital encoder 31 produces a position signal $P_A/V_D$ which may be interpreted by the CPU as an actual position and velocity signal. Likewise, the memory 14 is programmed with desired position information shown as $P_D/V_D$ which is fed to the CPU 12 which interprets the information as both position and velocity information. With the position and velocity information generated in the computer 12, a command signal may be produced on output line 15 which is capable of, driving the motor 23 to a desired position at a desired velocity. This digital implementation is also true for a linear motor as well as a rotary motor, the only difference being in the moving motor part and the digital encoder.

Figure 3:
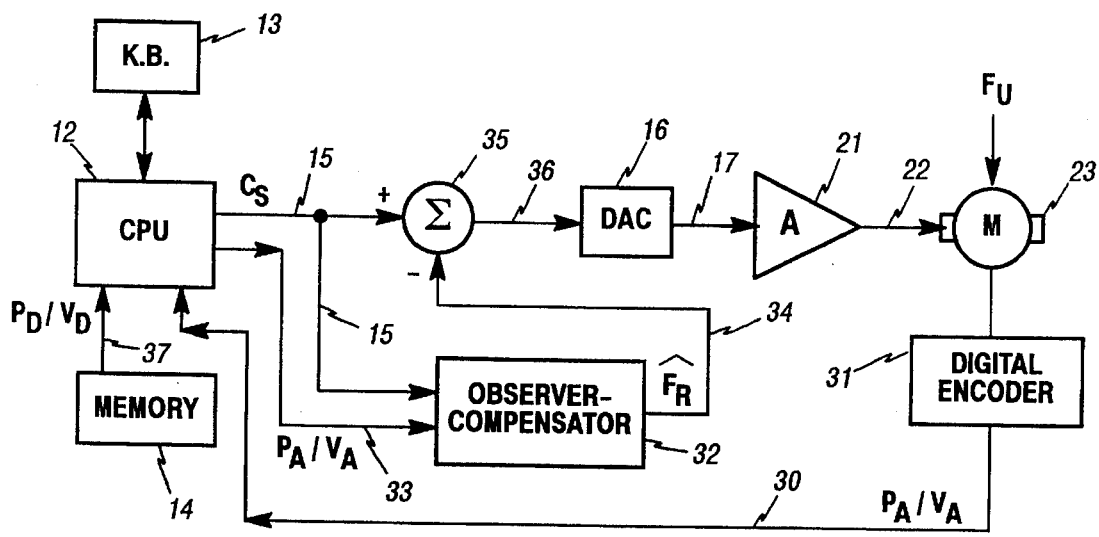
FIG. 3 is a schematic drawing of a closed loop processor controller for the Z drive of an electric motor having an observer-compensator in a feed forward loop.

Refer now to FIG. 3 showing a schematic drawing of a closed-loop microprocessor controller for an electric motor having an observer-compensator in a feed forward loop. The observer-compensator 32 is shown having an actual position/velocity signal $P_A/P_V$ on line 33 as one input, and a second input on line 15 from the command signal. The observer-compensator 32 is shown having a reconstructed unmeasurable force signal $\widehat{F_R}$ on line 34 which is applied to the negative input of summing circuit 35 to produce a compensated output signal on line 36 to the digital to analog converter 16. It will be appreciated that the motor system 23 is subject to unmeasurable disturbance forces shown as an input line $F_U$. When the observer-compensator 32 reconstructs the unmeasurable disturbance forces $F_U$ and generates an output $\widehat{F_R}$ equal to these forces $F_U$ on line 34, it is applied as a negative or opposite force to compensate for the unmeasurable disturbance forces $F_U$. In the preferred embodiment of the present invention, the signals on lines 30 are actual position signals from the encoder 31 and the signals from memory 14 are desired position signals imputed to the CPU 12 which converts the signals to the actual position and velocity signals on line 33 which will be explained in greater detail hereinafter.

Figure 4:
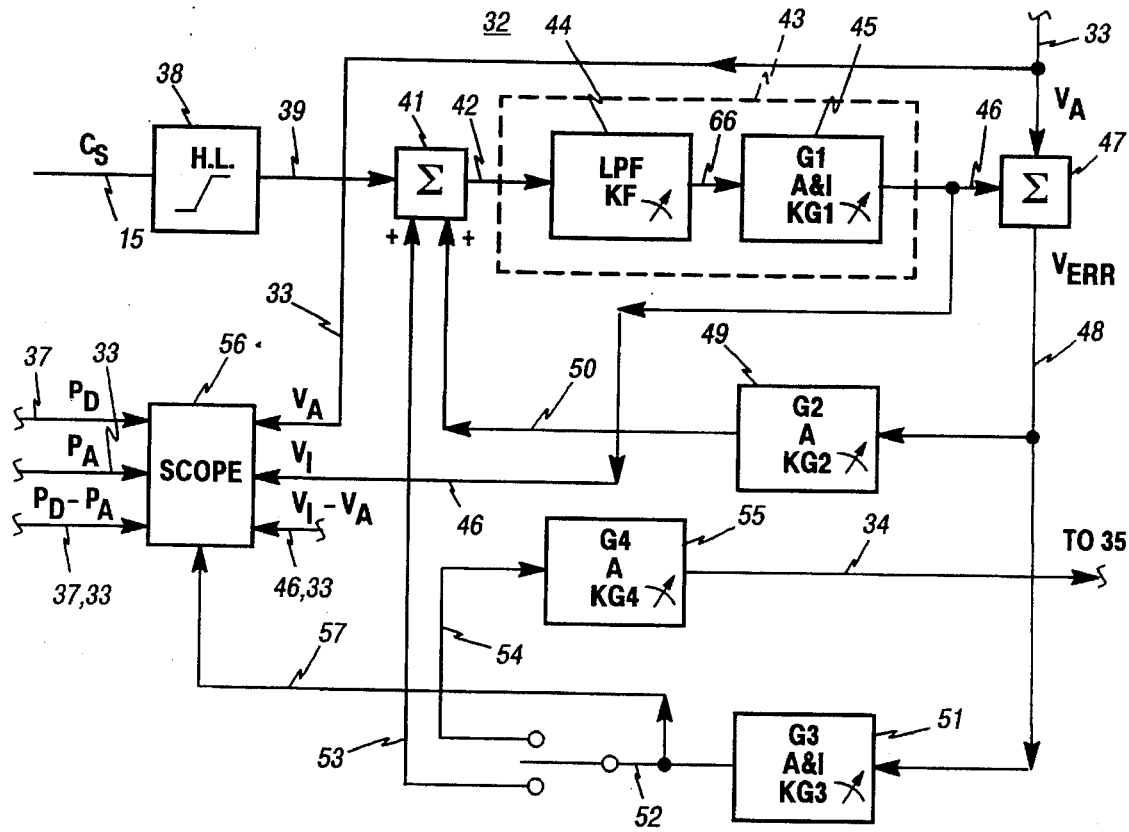
FIG. 4 is a detailed schematic drawing of a preferred embodiment observer-compensator having simulator circuits which may be implemented in hardware and/or software.

Refer now to FIG. 4 showing a detailed schematic drawing of a preferred embodiment observer-compensator 32 which may be implemented in either hardware or software. The aforementioned command signal on line 15 is processed and limited in hard limiter 38 and applied as a command signal on line 39 to a summing circuit 41 having an output 42 coupled to an ideal motor simulator 43. The ideal motor simulator 43 is shown comprising a simulated low pass filter 44 and a simulated amplifier and integrator 45. Both the filter 44 and adjustable gain control and integrator 45 are shown having adjustment gains. The output of the ideal motor simulator 43 on line 46 is applied as a simulated velocity $V_S$ to the negative input of a summing circuit 47 which has a second input at the positive port from line 33 on which an actual velocity signal $V_A$ is supplied. The on which an actual velocity signal $V_A$ is supplied. The velocity signal $V_S$ on line 46 is generated as an integration signal and when applied as a negative signal to summing circuit 47, produces on output line 48 a voltage error signal which is applied to a feedback gain device 49 in feedback loop 51 which is applied as a negative signal to summing circuit 41. In theory, the ideal motor simulator 43 can be made equal to the actual motor without any measurable disturbance forces, however, in practice it is impossible to have an exact ideal motor simulator which is equal to the actual motor system. Thus, the main control 49 is employed to overcome the differences between the ideal motor simulator and the actual motor system. The voltage error signal on line 48 is reduced to a minimum without consideration of the unmeasurable disturbance forces. The minimized velocity error signal on line 48 is applied to disturbance reconstruction device 51 which is shown as performing an amplification and integration function on the velocity error signal applied at the input by line 48. In the preferred embodiment of the present invention, when the voltage error signal on line 48 is zero, the disturbance reconstruction device 51 would have no function. However, when the unmeasurable disturbance forces are added to the actual system at the input 33 to summing circuit 47, there is an unmeasured disturbance forces effect in the form of a velocity error signal applied on line 48 to the gain control 51. The gain control 51 is adjusted when the switch 52 is in the lower position to produce an unmeasurable disturbance force compensation signal on line 53 which is applied to summing circuit 41 as a positive input. The signal on line 53 is adjusted by gain control 51 to compensate for any unmeasurable disturbance force on line 33 and the velocity error signal is again adjusted to approximately zero as will be explained in greater detail hereinafter. After the the switch 52 is raised to the upper position and the signal at the output of gain control 51 is applied to line 54 as an input to the adjustable gain control 55. As will be explained in greater detail hereinafter, the adjustable gain control 55 is employed to make a correction between the actual and the desired position.

In order to carry out the adjustment, the different adjustable gain devices 44, 45, 49, 51 and 55 and the oscilloscope 56 shown coupled to the observer-compensator is preferably employed. In order to more clearly explain how the novel observer-compensator makes adjustments of the simulation devices, it will be necessary to refer to the waveform shown in FIGS. 6 to 10 while making reference to FIG. 4.

Refer first to FIG. 5 showing a schematic drawing of a low pass filter 44 which may be simulated in software or made in hardware. The input to the low pass filter 44 shown in FIG. 4 is on line 42. This input signal is applied to a summing circuit 61 which may be implemented in software in the form of an adder. The output of the summing circuit (adder) 61 on line 62 is applied to an amplifier 63 which may be implemented in the form of a multiplier. The output of the amplifier 63 on line 64 is shown producing a square wave pulse on line 64 which is applied to an integrator 65 which may be implemented in software as an updown counter which performs the function of $Y=\int xdt$ in analog form or $Y(t+dt)=Y(t)+xdt$ in digital form. The output on line 66 is shown as the integrated waveform of the signal on line 64. The signal on line 66 is fed back to the summing circuit 61 as a negative input to complete the low pass filter.

Having explained a low pass filter and an amplifier in the low pass filter, it is possible to implement the complete observer-compensator 32 using the same elements in the CPU 12 as explained hereinbefore.

Having explained how the preferred embodiment system may be simulated in a digital computer, it is obvious that each of the elements shown in digital format in FIG. 4 may also be implemented in analog format to produce a similar result using analog signals.

Refer now to FIG. 6 showing a schematic waveform diagram of the output of the simulator 44 on line 46 and the output of the actual controller on line 33 before any adjustment or compensation is made. In FIG. 6, the gain control and integrator 45 is adjusted so that the amplitude of $V_A$ and $V_S$ are equal as shown in FIG. 7. Once the magnitudes $V_S$ and $V_A$ are equal, it is possible to now adjust the gain $K_F$ and low pass filter 44 to produce coincidence of $V_A$ and $V_S$ as shown in FIG. 8. It will be understood that the foregoing adjustments made by gain 45 and low pass filter 44 are gross adjustments with a minimum of cogging forces. Having made the gross adjustments by observing the waveforms on the oscilloscope 56, a different set of inputs are now employed to make fine adjustment.

Refer now to FIG. 9 showing a schematic waveform diagram of the velocity error signal when low cogging error signals are present and after a first compensation and stabilization has been made to the simulator as explained with FIGS. 6 to 8. The error signal on line 48 is now stabilized and adjusted by adjusting the gain in gain control 49 to produce a feedback signal on line 50 to produce the before and after waveform shown in FIG. 9. The lower waveform being the waveform produced after the gain control 49 is inserted into the feedback loop 50. At this point, it is important to understand that the actual motor 23 has been positioned at some trajectory or point of its operation so as to produce the minimum or lowest possible cogging force. Thus, the velocity error signal on line 48 does not have any signal component representative of cogging forces.

At this point in time, the motor 28 is moved to a trajectory or position where high cogging forces are present which will generate new velocity error signals on line 48. The gain control 51 is now adjusted with the switch 52 in the down position to create a feedback signal on line 53. The gain control is adjusted until the new velocity error signal on line 48 is reduced to substantially zero in the presence of the cogging force error. Further, it will be realized that in order to create this cogging error signal, the motor 28 is being moved over a linear trajectory to produce the cogging error signal on line 48. The output at switch 52 from a disturbance reconstruction device 51 is a signal representative of the cogging force to be compensated for or eliminated. This force has been recorded for different trajectory positions and printed out and shown in FIG. 14 which will be explained in greater detail hereinafter.

At this point in time the simulation by the disturbance reconstruction device 51 has not been applied to the actual motor system. When the switch 52 is raised to the up position, the simulation device signal is applied to a gain control 55. It is necessary to apply to the scope 56 the signals on line 37 and 33 shown as the desired $P_D$ and actual $P_A$ positions and their difference $P_D-P_A$. This adjustment is similar to the adjustments made using the scope 56 when the velocity signals on lines 33 and 46 are adjusted using the adjustable gain controls in elements 44, 45 and 49.

Figure 11:
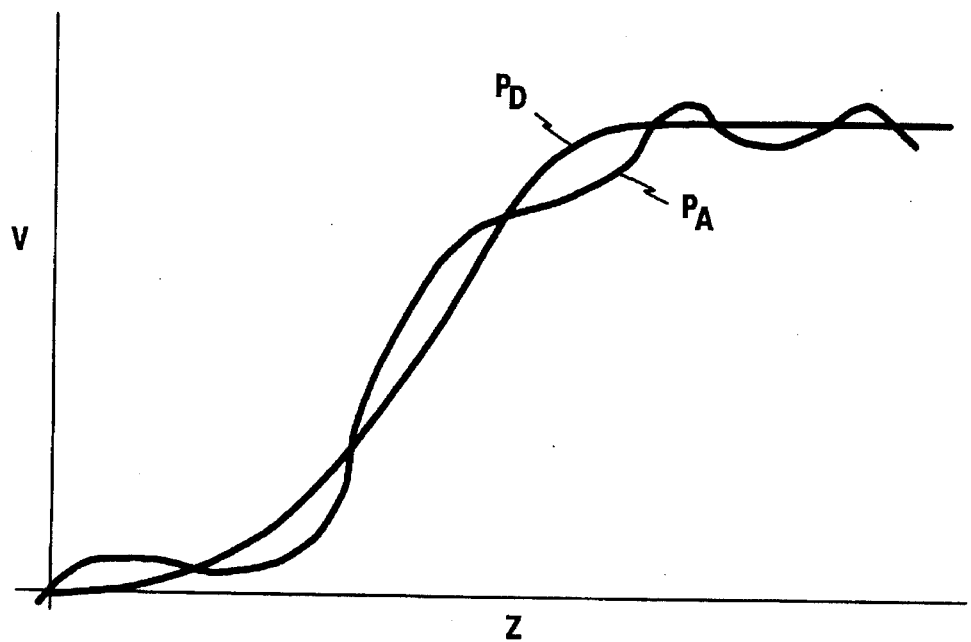
FIG. 11 is an enlarged schematic diagram of a desired position waveform and an actual position waveform showing high cogging forces before any compensation.

Refer now to FIG. 11 showing an enlarged schematic waveform diagram of the desired position ($P_D$) versus the actual position ($P_A$) when high cogging forces are present before any compensation. FIG. 11 is self-explanatory showing how the actual position and trajectory is affected by the cogging force. It will be understood that FIG. 11 is only representative of one typical instance of a cogging force affecting the desired position on a velocity trajectory curve. Cogging forces are so unpredictable that they may speed up, slow down, create lags and create oscillations and such forces are unmeasurable.

Figure 12:
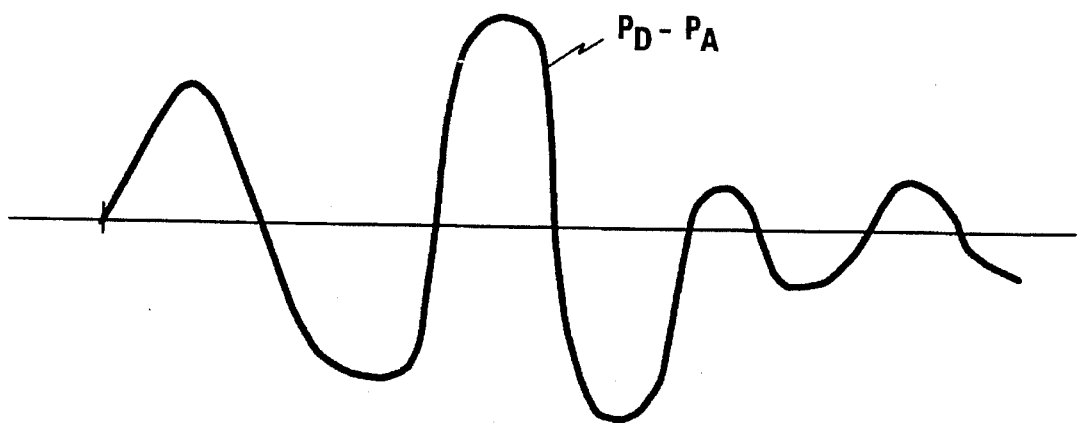
FIG. 12 is an enlarged schematic waveform diagram showing the difference between the desired position waveform and an actual position waveform before any cogging compensation is provided.
Figure 13:
FIG. 13 is enlarge schematic waveform diagram showing the difference between a desired position waveform and an actual position waveform after employing an anti cogging compensator devise in the observer-compensator of FIG. 4.

Refer now to FIG. 12 showing a schematic waveform diagram on which the difference between a desired position $P_D$ and an actual position $P_A$ is plotted before the anticogging compensation device 55 is inserted and properly tuned in the circuit shown in FIG. 4. Once the signal shown in FIG. 12 is presented on the screen of the scope 56 shown in FIG. 4, it is possible to adjust the gain of the gain control device 55 to reduce the difference between the desired and actual position to a minimum. It is well known that it is impossible to reduce such error signals to absolute zero. However, as shown in FIG. 13, the difference between the desired position $P_D$ and the actual position $P_A$ may be reduced by adjusting gain control 55 to a minimum which does not affect the motor system. This minimum is shown and has been proven to be less than 3%. For all practical purposes, when this much compensation is made in the actual motor system, the motor acts as if there was no cogging force or unmeasurable disturbance force present. This result has not been achieved by any system known in the prior art heretofore.

While the preferred embodiment of the present invention has been illustrated with data from an actual linear motor acting under high velocity, high cogging forces, it will be recognized that the preferred embodiment of the present invention may be applied to rotary electric motors and may be applied to any other motors of the type that are used in flight controls and/or positioning devices used in radar, optical tracking systems, numerical control systems, and gun control systems. Further, the present invention is not limited to electric motors but may be used in fluid motor actuating systems.

Figure 14:
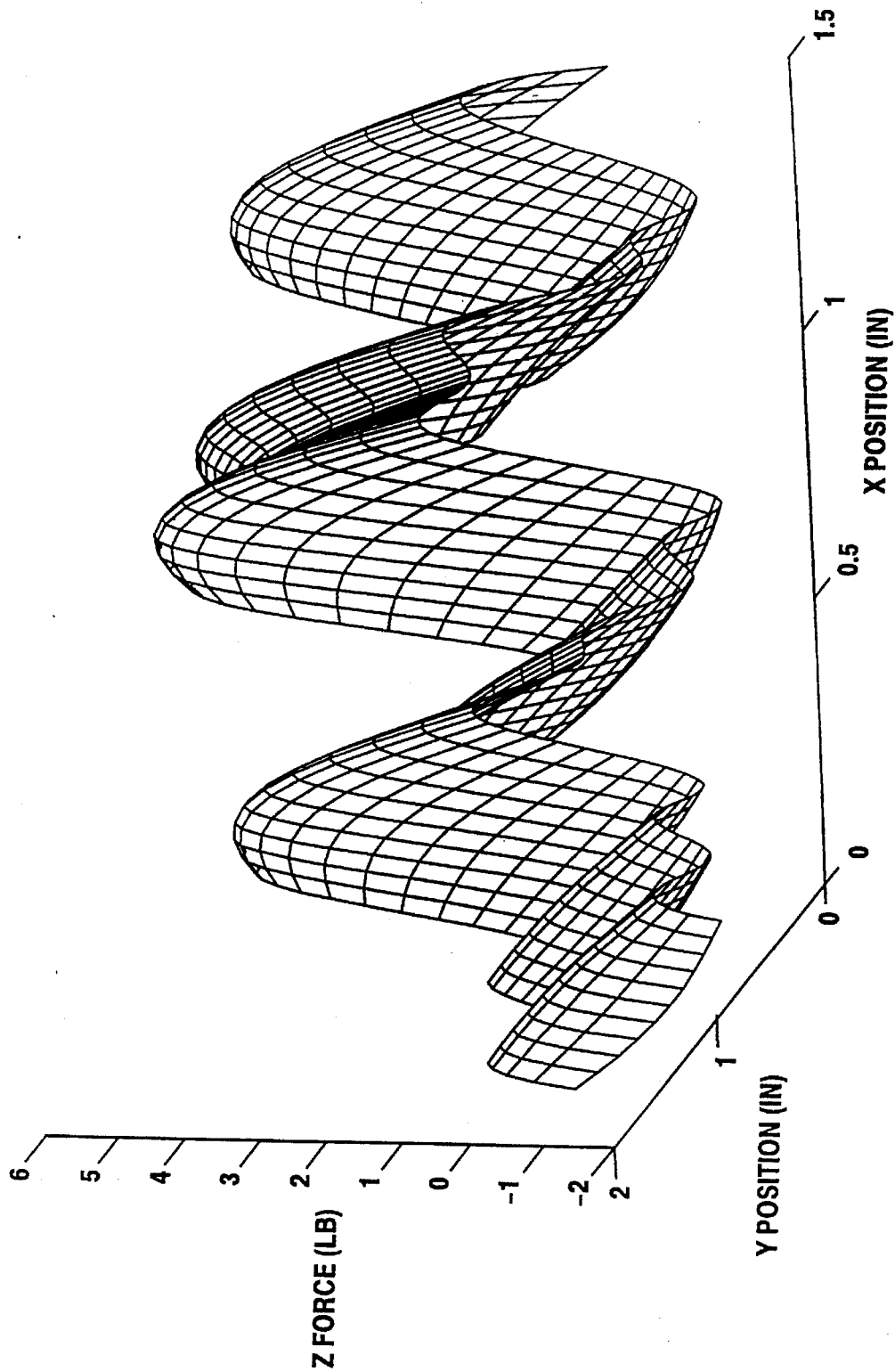
FIG. 14 is a isometric drawing of the unmeasurable cogging forces generated at the output of the preferred embodiment observer-compensator.

Refer now to FIG. 14 showing an isometric drawing of the unmeasurable cogging forces generated at the output of the disturbance reconstruction device 51. Examination of the plural waveforms shown in FIG. 14 provides factual data to support the contention that unmeasurable disturbance forces had not been measured in the prior art. Designers of motors for the first time can now observe a waveform representation of cogging forces which were heretofore unmeasurable.

Having explained a preferred embodiment of the present invention employing an actual linear motor which produces high cogging forces and explaining an observer-compensator 32 which will permit first the simulation of an ideal motor in the simulator 43 and a further simulator 49 which is a gain control to overcome any differences between the ideal and the actual motor system, it will be appreciated that the present observer-compensator works best when the observer of the system represented by simulator 43 and 49 is fine-tuned to reduce velocity error signals on line 48 to an absolute minimum. Thus, any error on line 48 which is introduced into the disturbance reconstruction device compensator represented by devices 51 and 55 should be negligible which permits the reconstruction device 51 to compensate only for the cogging and/or unmeasurable disturbance forces. Then it is possible to adjust the gain control 55 to overcome any minor error differences that are left in the compensation system.

What is claimed is:

1. A method of compensation for unmeasurable disturbance forces in a motor system of the type including a positioning motor to be accurately positioned at high speed in response to positioning command signals generated by a computer controller which is coupled to the motor system, comprising the steps of:

connecting an observer-compensator in a feed forward loop between the output of said computer controller and the input to said motor system, actuating said motor over a limited range of physical positions in which negligible disturbance forces occur, adjusting an ideal motor simulator in said observer-compensator during movement of said motor where negligible disturbances forces occur to provide an ideal motor simulator equal to the said motor system, actuating said motor over a range of physical positions in which high disturbance forces occur, subtracting the output signal from said ideal motor simulator from a similar output signal from the actual motor system to provide a disturbance force error signal, coupling said disturbance force error signal to a disturbance force reconstruction device in said compensator-observer, coupling the output of said disturbance force reconstruction device as a negative input to said actual motor system, and adjusting said disturbance force reconstruction device until the disturbance force error signal is reduced to a minimum and said disturbance force reconstruction device is made substantially equal to said unmeasurable disturbance forces in said actual motor system.

2. A method as set forth in claim 1 wherein the step of adjusting said disturbance force reconstruction device comprise the step of:

observing the tracking error between desired motor position ($P_D$) and the actual motor position ($P_A$) while adjusting said disturbance force reconstruction device to reduce said tracking error to a minimum so that the actual motor system behaves as if the unmeasurable disturbance forces did not exist.

3. A method as set forth in claim 1 wherein said motor system comprises an electric motor system and said unmeasurable disturbance forces comprise cogging forces, and the step of adjusting said disturbance force reconstruction device includes the step of compensating for said cogging forces.

4. A method as set forth in claim 1 wherein said motor system comprises one of a plurality of drive motor systems for a flight control system and the step of actuating each of said motors over a range of positions in which high disturbance forces occur comprises the step of:

simulating said high disturbance forces on said flight control system, and actuating each said motor over a range of simulated disturbance forces so that said reconstruction devices compensate for said high disturbance forces.

5. A method as set forth in claim 1 wherein said motor system comprises a plurality of drive motor systems in which one or more drive motor system interacts as disturbance forces on one or more of the remaining plurality of drive motor systems, and the step of:

placing an observer-compensator in said feed forward loop comprises the step of placing an observer-compensator in each of the feed forward loops of each motor system, and wherein the final step of adjusting said disturbance force reconstruction device comprising reducing the unmeasurable disturbance force in each motor system so that interactive disturbance forces as well as other unmeasurable disturbance forces are reduced to a minimum.

6. A method as set forth in claim 1 wherein said plurality of drive motor systems comprise at least one drive motor system for a multi axis device and movement of a drive motor in one axis creates an unmeasurable disturbance force on another drive motor system, said method comprising the steps of:

placing an observer-compensator in the feed forward loop of each drive motor system, and adjusting said disturbance force in each of said drive motors sequentially until the unmeasurable disturbance forces in each drive motor system is reduced to a minimum.

7. A method as set forth in claim 1 wherein the step of coupling the output of said disturbance force reconstruction device to said actual motor system comprises the step of:

subtracting the output of said disturbance force reconstruction device from said command signals of said computer controller.

8. A method as set forth in claim 1 wherein said step of placing an observer-compensator in a feed forward loop between said motor and said computer controller comprises the steps of:

simulating an observer-compensator in said computer controller and subtracting the output of said disturbance force reconstruction device from said command signal in said computer controller.

9. A method as set forth in claim 8 wherein said step of adjusting an ideal motor simulator in said observer-compensation comprises the step of:

simulating an ideal motor simulator in said observer-compensator.

10. A method as set forth in claim 9 wherein the step of simulating an ideal motor simulator comprises the steps of:

simulating a low pass filter in series with an amplifier and integrator.

11. A method as set forth in claim 10 wherein the step of adjusting an ideal motor simulator comprises the step of adjusting the gain control in said low pass filter and said amplifier.

12. A method as set forth in claim 1 wherein the step of adjusting an ideal simulator in said-observer-compensator comprises the step of:

simultaneously observing the output of said ideal motor simulator and the output of the actual said motor system.

13. A method as set forth in claim 1 wherein the step of adjusting said disturbance force reconstruction device comprises the step of:

simultaneously observing the velocity/position output of said ideal motor simulator and the velocity/position output of the actual said motor system.

14. A method as set forth in claim 13 wherein the step of adjusting said disturbance force reconstruction device further comprise the step of:

simultaneously observing the position/velocity error signal.

15. Apparatus for compensating for unmeasurable disturbance forces in a positioning motor system of the type which comprise:

a computer controller for generating a plurality of command signals indicative of desired motor positions, an encoder coupled to the motor in said motor system for generating actual motor position signal signals, said actual motor position signal being coupled to said computer controller for indicating an actual motor position and velocity, and an observer-compensator coupled in a feed forward loop between the command signal output of said computer controller and the actual motor system, said observer-compensator comprising an ideal motor simulator coupled to the command signal output for simulating the actual motor system without said unmeasurable disturbance forces, and a disturbance force reconstruction device having an output coupled to the input of said actual motor system for compensating for said unmeasurable disturbance forces.

16. Apparatus as set forth in claim 15 where said observer-compensator comprises:

means for adding or subtracting the output from said disturbance force reconstruction device to the command signal output of said computer-controller to compensate for said unmeasurable disturbance forces.

17. Apparatus as set forth in claim 15 wherein said ideal motor simulator and said disturbance force reconstruction device are simulated in said computer-controller for controlling said actual motor system.

18. Apparatus as set forth in claim 17 wherein said computer-controller comprises means for adjusting said ideal motor simulator to equal the actual motor system without said unmeasurable disturbance forces, and means for adjusting said disturbance force reconstruction device to equal said unmeasurable disturbance forces.

19. A method of compensation for unmeasurable disturbance forces in a high speed motor system of the type which includes a computer controller programmed to generate a plurality positioning command signals that are coupled as drive signals to a motor having an encoder for indicating its actual position, the output of the encoder is coupled through a feedback loop to the computer controller that calculates the next command signal, comprising the steps of:

connecting an observer compensator in a feed forward loop between the command signal output of said computer controller and the input to said motor system for modifying said command signal, reciprocating said motor in a limited operable range of positions where negligible disturbance forces occur, adjusting an ideal motor simulator (43, 49) in said observer-compensator to closely equal the actual motor when negligible disturbance forces occur, reciprocating said motor in a limited operable range of positions where very high unmeasurable cogging forces occur, adjusting a disturbance reconstruction device (51,55) in said observer-compensation to closely equal the unmeasurable disturbance forces when high disturbance forces occur, subtracting the output (@ 34) of said disturbance reconstruction device (51,55) from the positioning command signal that are coupled as drive signals to motor system.

20. The method as set forth in claim 19 wherein the steps of adjusting an ideal motor simulator and a disturbance reconstruction device comprises the step of adjusting a first gain control (49) in said ideal motor simulator and the step of adjusting a second gain control (55) in said reconstruction device to fine tune the magnitude of said simulators.

\* \* \* \* \*